(No Model.)
T. G. W. & L. McMEEKIN.
VEHICLE WHEEL HUB.
No. 316,560. Patented Apr. 28, 1885.
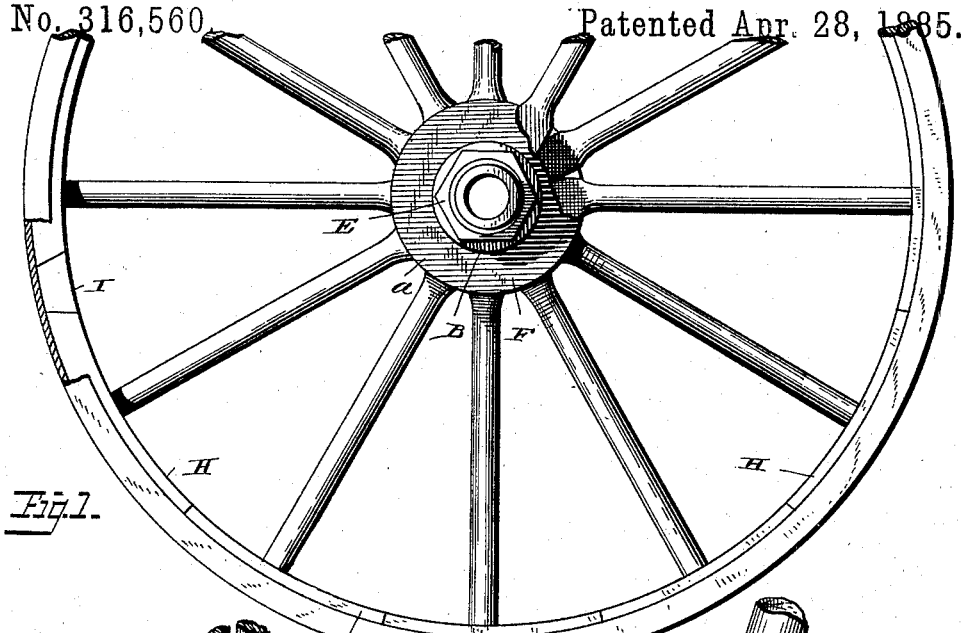
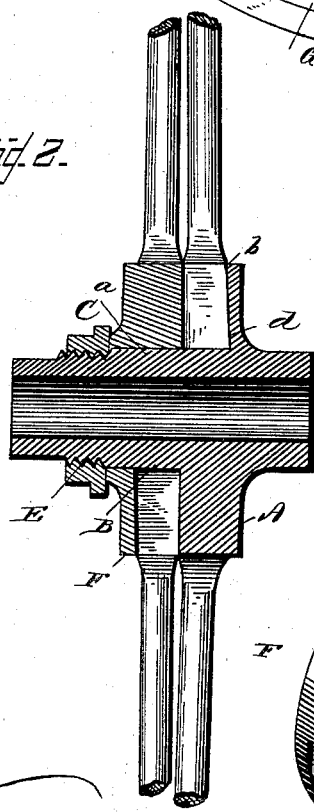
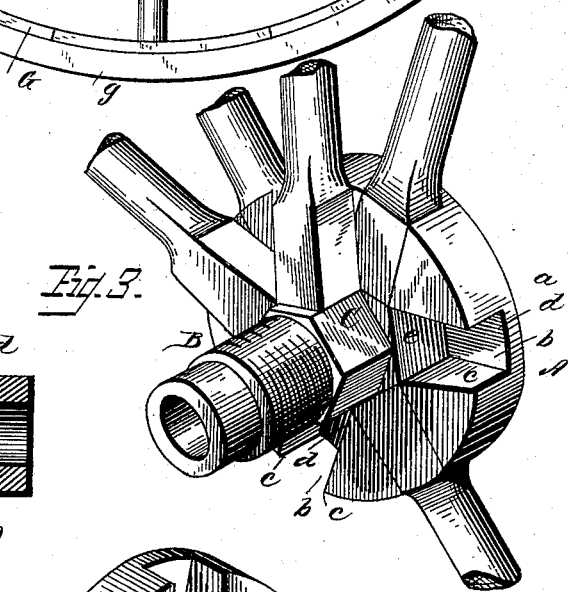
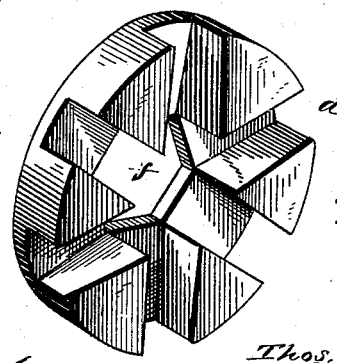
WITNESSES
INVENTORS.
Thos. G. W. McMeekin
Lucinda McMeekin
By Gilmore and Co.
their Attorneys.

UNITED STATES PATENT OFFICE.

THOMAS G. W. McMEEKIN AND LUCINDA McMEEKIN, OF CEDAR TOWN, GA.

VEHICLE-WHEEL HUB.

SPECIFICATION forming part of Letters Patent No. 316,560, dated April 28, 1885.

Application filed December 16, 1884. (No model.)

*To all whom it may concern:*

Be it known that we, THOMAS G. W. MC-MEEKIN and LUCINDA McMEEKIN, citizens of the United States, residing at Cedar Town, in the county of Polk and State of Georgia, have invented certain new and useful Improvements in Vehicle-Wheels, of which the following is a specification, reference being had to the accompanying drawings.

This invention has relation to improvements in vehicle-wheels in which the hub is formed in sections having staggering spoke-sockets; and it has for its object to provide a cheap and simple means for tightening the spokes in their sockets, giving the same any desired dish, and obviating the objectionable necessity of tenoning the spokes. Another object in view is to provide means for adjusting or tightening the felly-sections; and with this end in view we have provided a tire of peculiar construction, all as will be hereinafter more fully set forth, and particularly pointed out in the claims appended.

Figure 1 of the drawings is a side view of a wheel, parts being broken away to show its construction. Fig. 2 is a sectional view of the hub. Fig. 3 is a view of the hub with its rigid flange, and Fig. 4 is a perspective view of the movable shell.

Referring by letter to the accompanying drawings, a indicates the hub, which is preferably formed of cast metal, having the external annular flange, A, provided with the sockets b. These sockets radiate annularly from the tubular body portion B, and are preferably dovetail, having their side walls, c, diverging outwardly, and their end walls, d, diverging inwardly, so that when a spoke has been placed in the sockets, or any of them, they will assume the proper angle or oblique position with relation to the felly or tire, and the inner walls of the sockets are plain to engage the inner ends of the spokes.

Adjacent to the annular flange A, upon the tubular portion B, is an external polygonal portion, C, the flat sides of which alternate with the flat side walls, e, of the said sockets, and correspond with the meeting side walls of the sockets b, the same rising from the base of the said flat sides of the polygonal portion, respectively, and are designed to engage one side of the alternating spokes, thereby preventing the two sets of spokes from actual contact, as will be presently explained. At the outer end of this polygonal portion, upon the said tubular portion, are formed screw-threads, to receive an internally-threaded annulus, E, and this annulus is designed to hold and properly adjust the shell F. The shell is of a contour similar to that of the socket-flange A, having its sockets arranged in a staggering position with those of the said flange, and the meeting walls of the sockets of the hub-flange coming directly opposite the sockets of the shell, and vice versa, with all the spoke-sockets of the shell. The shell E is also provided with a polygonal-shaped horizontal aperture, $f$, to receive the corresponding portion of the tubular portion $a$, and thereby prevent the same from turning when placed in position.

G indicates the tire, which may be of any ordinary or approved construction, and is provided with an inwardly-extending marginal annular flange, $g$, to receive the felly.

By the use of this flange in connection with the hub of the peculiar construction set forth it will be perceived that the experienced objection of cutting and tightening the tire after but little use is obviated.

The felly may be formed of the ordinary wooden sections, H, having sockets for the outer ends of the spokes. In connection with these sections we employ one or more wedge-sections, such as I. These sections are designed, when found desirable to tighten the felly-sections, to place one or more between the said felly-sections, which will effectually press them forcibly together, and thereby tighten all the sections. Should it then be found desirable to tighten the spokes, the same may be readily effected by simply screwing up the threaded annulus upon the tubular portion of the hub. It will also be observed that by the construction illustrated the spokes are not tenoned at their inner ends, as has heretofore been the practice in wheels of this character, but are stouter at this point, where the greatest strength is desirable.

Having described this invention, what we claim is—

1. In a vehicle-hub having an annular flange formed integral therewith and provided with dovetail spoke-sockets, the combination therewith of a movable shell having similar sockets adapted to alternate with the fixed sockets in a staggering position, the tubular portion of the hub having external threads, and the internally-threaded annulus adapted to hold the movable or shell section in engagement with the fixed section, substantially as specified.

2. The hub having the tubular portion provided with the external flange having spoke-sockets and adjacent to the sockets a polygonal portion, the angles of the flat sides of which are presented about the middle of the said sockets, in combination with the shell, constructed as described, and provided with the polygonal aperture to engage the polygonal portion of the hub and provided with the threaded annulus adapted to engage the said shell, substantially as specified.

In testimony whereof we affix our signatures in presence of two witnesses.

THOS. G. W. McMEEKIN.
LUCINDA McMEEKIN.

Witnesses:
T. Q. RAY,
J. L. TEAT.